(12) United States Patent
Hudak et al.

(10) Patent No.: US 7,958,012 B2
(45) Date of Patent: Jun. 7, 2011

(54) SYSTEM AND METHOD FOR ENABLING ONLINE RESEARCH, PUBLICATION, PROMOTION AND MANAGEMENT OF USER GOODS

(75) Inventors: William N. Hudak, Palo Alto, CA (US); David E. Keefer, Menlo Park, CA (US); Jordan R. Kobert, San Francisco, CA (US)

(73) Assignee: Thintail, Inc., Palo Alto, CA (US)

( * ) Notice: Subject to any disclaimer, the term of this patent is extended or adjusted under 35 U.S.C. 154(b) by 1034 days.

(21) Appl. No.: 11/682,278

(22) Filed: Mar. 5, 2007

(65) Prior Publication Data

US 2008/0222010 A1 Sep. 11, 2008

(51) Int. Cl.
*G06Q 30/00* (2006.01)
(52) U.S. Cl. ............................................ 705/26; 705/37
(58) Field of Classification Search ............... 705/26, 705/37, 26.1, 37.1, 27.1
See application file for complete search history.

(56) References Cited

U.S. PATENT DOCUMENTS

| 6,904,449 | B1 * | 6/2005 | Quinones ..................... 709/203 |
| 2003/0069740 | A1 | 4/2003 | Zeidman |
| 2010/0005004 | A1 | 1/2010 | Hudak et al. |
| 2010/0287069 | A1 | 11/2010 | Hudak et al. |

OTHER PUBLICATIONS

Michael Schrenk, Writing intelligent Web agents, Web Techniques. San Francisco: Mar. 2000. vol. 5, Iss. 3; p. 59, downloaded form ProQuestDirect on the Internet on Mar. 29, 2010, 10 pages.*

* cited by examiner

*Primary Examiner* — James Zurita (57) ABSTRACT

A system and method for enabling online research, publication, promotion, and management of user goods is presented. An embodiment guiding the process of online selling across multiple platforms is presented. Information is gathered from various sources across the Internet to determine pricing and publication options. Data and user input are aggregated to create a listing. Listings are published and promoted across platforms and channels and feedback is presented to the user through an online interface.

4 Claims, 11 Drawing Sheets

FIG. 9 (con't)

FIG. 10

SYSTEM AND METHOD FOR ENABLING ONLINE RESEARCH, PUBLICATION, PROMOTION AND MANAGEMENT OF USER GOODS

FIELD OF THE INVENTION

This invention relates in general to the web-based selling of goods and in particular, a system and method for providing efficient tools to individual, non-business focused sellers in order to enable their online selling through existing and future marketplaces.

BACKGROUND OF THE INVENTION

The proliferation of online selling through various web auction and classified sites has led to rapid growth in online commerce. This growth however, while initially targeted at the individual user, has come primarily through the larger more experienced user or the Business to Consumer (B2C) relationship. Despite the notion that the internet has increased online selling (which it has, via B2C market growth), the individual consumer does not, on average, sell online. Reasons for this are many however the primary reasons are the result of ever increasing complexity and disaggregation of the online selling market.

Online selling requires deep understanding of a number of elements as well as the online marketplaces. Knowledge of an individual's product including but not limited to: name, model number, year of manufacture, weight, size, applications, accessories, compatibility, color, warranty, etc., are essential to help the user describe their product to a potential buyer. Further, the user must understand the different marketplaces that exist as well as their individual selling restrictions: auction, fixed price, classified, local, regional, national, shipping, payment and other parameters all differ greatly across platforms and across product categories.

Successful online selling comes from a deep understanding of the above mentioned parameters as well as the time and expertise to list, track and manage products across multiple selling marketplaces.

Beyond listing, users must currently rely on the marketplaces they choose to acquire potential online buyers and direct those buyers to their listing. In this case, the average internet user is competing against large professional entities with skilled divisions devoted towards buyer acquisition. Without the appropriate tools to leverage their existing network of potential buyers, the individual seller is at a disadvantage in an inefficient yet competitive marketplace.

Additionally, knowledge about the performance of one's online selling is imperative to the success of future sales as well as the comfort that one feels with the selling process. Existing tools to support this process exist only for the established, Professional seller.

Therefore there is a need for a service that provides information to the average user regarding the options, pathways, and potential outcomes of online selling. Further, in order to enable successful online selling, the service would ideally aggregate information from multiple sources across the Internet and provide the user with direction, tools, and the necessary feedback to manage their online selling.

SUMMARY OF THE INVENTION

The present invention relates in general to the web-based selling of goods. In one aspect, the present invention relates to a system and method for providing efficient tools to individual, non-business focused sellers.

In one embodiment, the present invention collects existing data and applies category product and listing mapping technologies in order to create a unique structure data set. A website in which this data is aggregated and presented provides the opportunity to search, buy, and sell products online. An aggregation of historical data and content, describes expected outcomes and provides guidance. An interface guides input into user preferences.

In a preferred embodiment, software functions combined with user edited and stored data are used to create an online listing prepared for distribution. A combination of internal processes that match product attributes with user edited fields.

In a further embodiment information about online listing performance, marketplace activity, and buyer/seller matching, is presented.

Still further embodiments of the invention will become apparent to those knowledgeable in the technology and space from the attached detailed diagrams, wherein are described embodiments of the invention by way of illustrating the best mode contemplated for carrying out the invention. The invention is capable of other capacities in different embodiments and its many details are capable of modifications in various respects, all without departing from the original spirit and scope of the invention. Accordingly the process flow diagrams and detailed description are to be regarded as illustrated in nature and not as restrictive.

DETAILED DESCRIPTION

Figure 1:
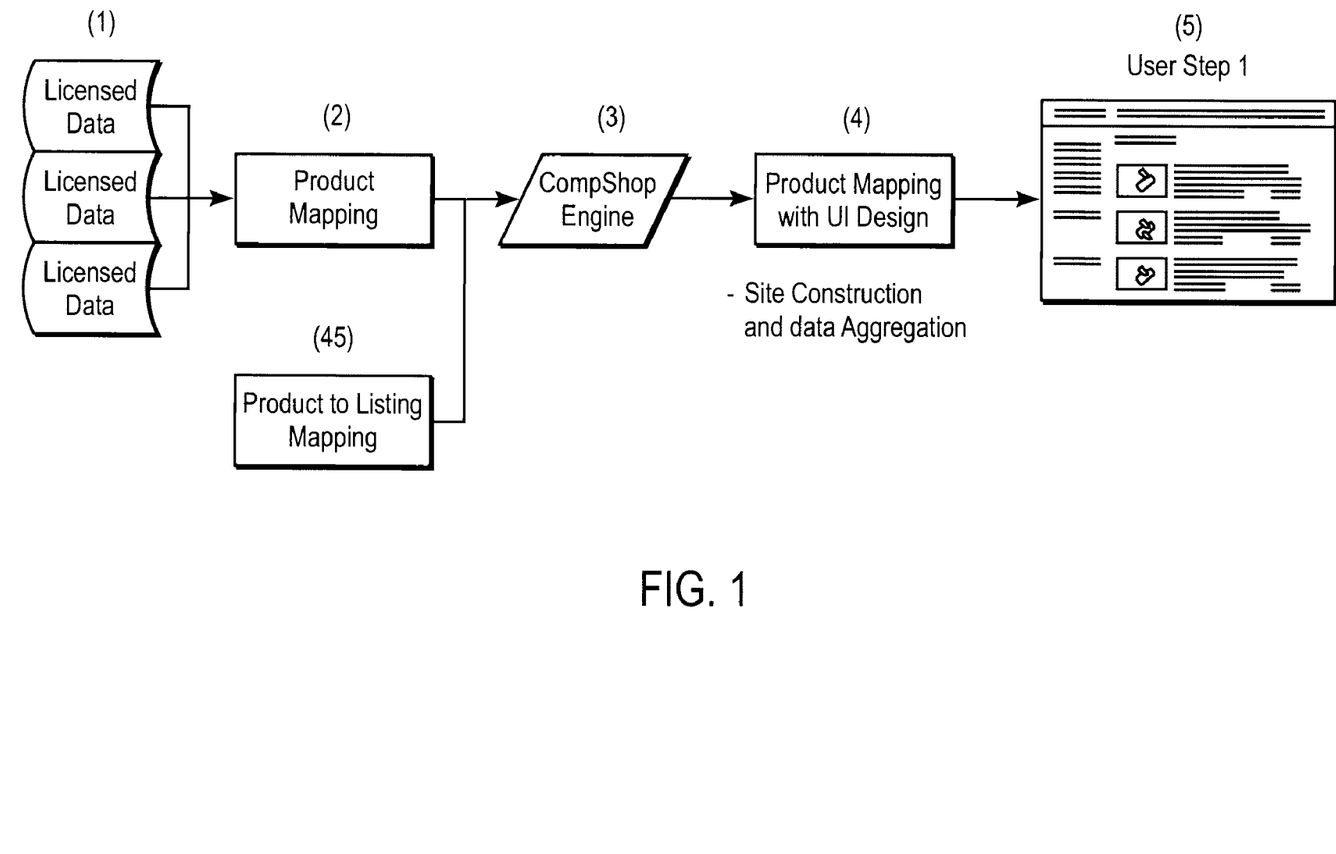
FIG. 1 is a process flow diagram showing how data is aggregated, structured, and compiled into a comparison shopping engine.

FIG. 1 shows the process by which data is licensed 1 or stored from various sources. The data can be sourced from various places across the internet and stored on servers locally. Data that is then accessed upon initiation of a user search which calls information based on a specific product. This data is then structured and organized 2 based on structured category mapping and product-to-listing mapping that examine data structure and tags as they relate to product categories. The structured data is fed into an analytical engine 3. Categories are sub-divided by products with tables of product attributes providing the final structure. Data aggregation and site development including an embodiment that presents data, photographs and allows for search functionality 4 provide the final user interface for this process.

Figure 2:
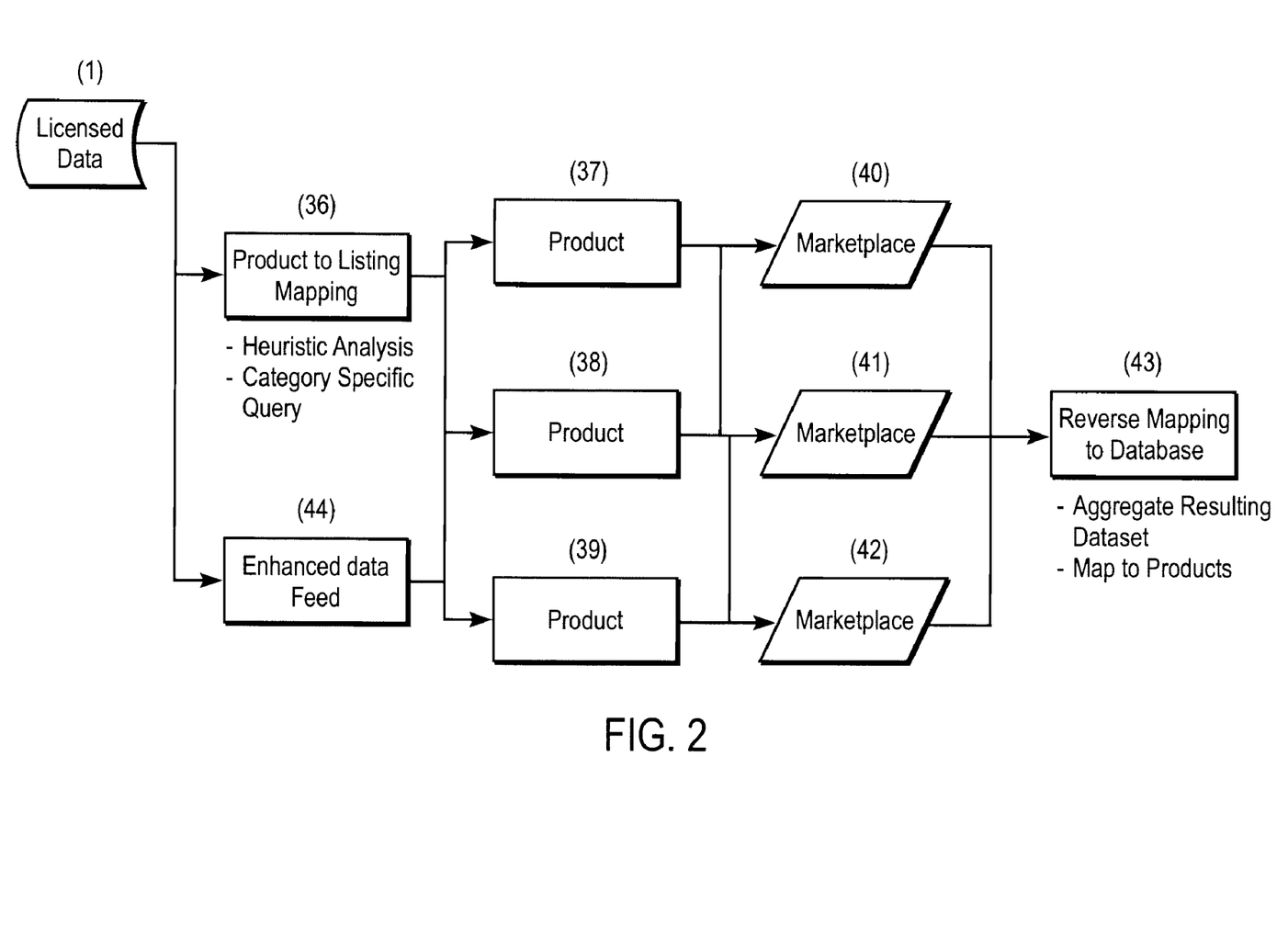
FIG. 2 is a process flow diagram depicting the product-to-listing mapping feature of the embodiment along with an overview of the enhanced Data Feed Structure.

FIG. 2 presents the overview of the process for both product-to-listing mapping (45 as represented by the subset in FIG. 2 of 36 through 43) as well as the enhanced data feed feature 44 that will apply a unique product to listing mapping technology in order to repopulate existing categories with new user edited listings.

In this portion of the embodiment, licensed or otherwise acquired data 1 is stored on local servers and categorized using both sourced based categorization methods as well as customized methods designed herein. These customize methods build upon the structured data sets presented with each product category from the origination point. Traditional categorization of product sets involves a standard heuristic of category at the highest level and product (or product ID/number) at the lowest level.

In this process 45 for the purpose of price estimation, enhanced structuring and categorization is applied to the existing product set in order to more accurately reflect historical pricing for individual products. As compared to current processes—wherein a product name is associated with a product family that may or may not include the product to be searched as well as other elements included in that product family including but not limited to; accessories modifications and aftermarket items—the process described herein adds depth and accuracy by mapping product "families" in customized groups based on search preferences of the user. As an example, a combination of "brand"+"category" is currently, in most embodiments, mapped to the product family of all items that fall under that brand (where category relates to a category of retail products such as "digital cameras" or "shoes"). This can, as stated above, include non "category" items but items that are used in conjunction with the targeted product or like category. As in the example above, "digital cameras", these adjacent products can include accessories, adaptors, and additional aftermarket items.

The creation of new product "families" and a more detailed scrubbing of the original data is combined with enhanced search recognition (both in keyword and drill-down methods) to provide a more accurate estimation of historical pricing based on traditional product data. Data from existing marketplaces (such as eBay) can be mined to show closed listing prices (what was paid in respective market places). In addition to price, this data can also include but is not limited to location, listing process, sale price, duration of sale, seller id, number of item views, number of item bids, day of sale start, day of sale end, number of images used in listing as well as many others. This data is mapped as described above in order to remove data skewing from adjacent yet irrelevant products. Upon completion of this data scrubbing and analysis, the information will be presented to the user for confirmation. The user will confirm by continuing in the process but will have the option of editing the parameters of the data to alter the results. Once confirmed the listing is then stored on local servers and used for future searches pertaining to like products. Further, the data is reinserted into the search results on comparison-shopping site through enhanced data feed 44.

This data and product structure is re-inserted into the local product database so that as each new search (with potential additions and user edited products) is performed, the database grows and those products are available for future searches at the local site.

Additionally, this process 44 by which existing data feeds and the structure therein, are enhanced through the definition of a minimal required number and type of product parameters is presented. Data feeds with multiple attributes per product are presented. Analysis of the minimal, number of unique attributes per product category is performed and when determined necessary by said analyses, additional enhanced product attributes are recognized and inserted.

Figure 3:
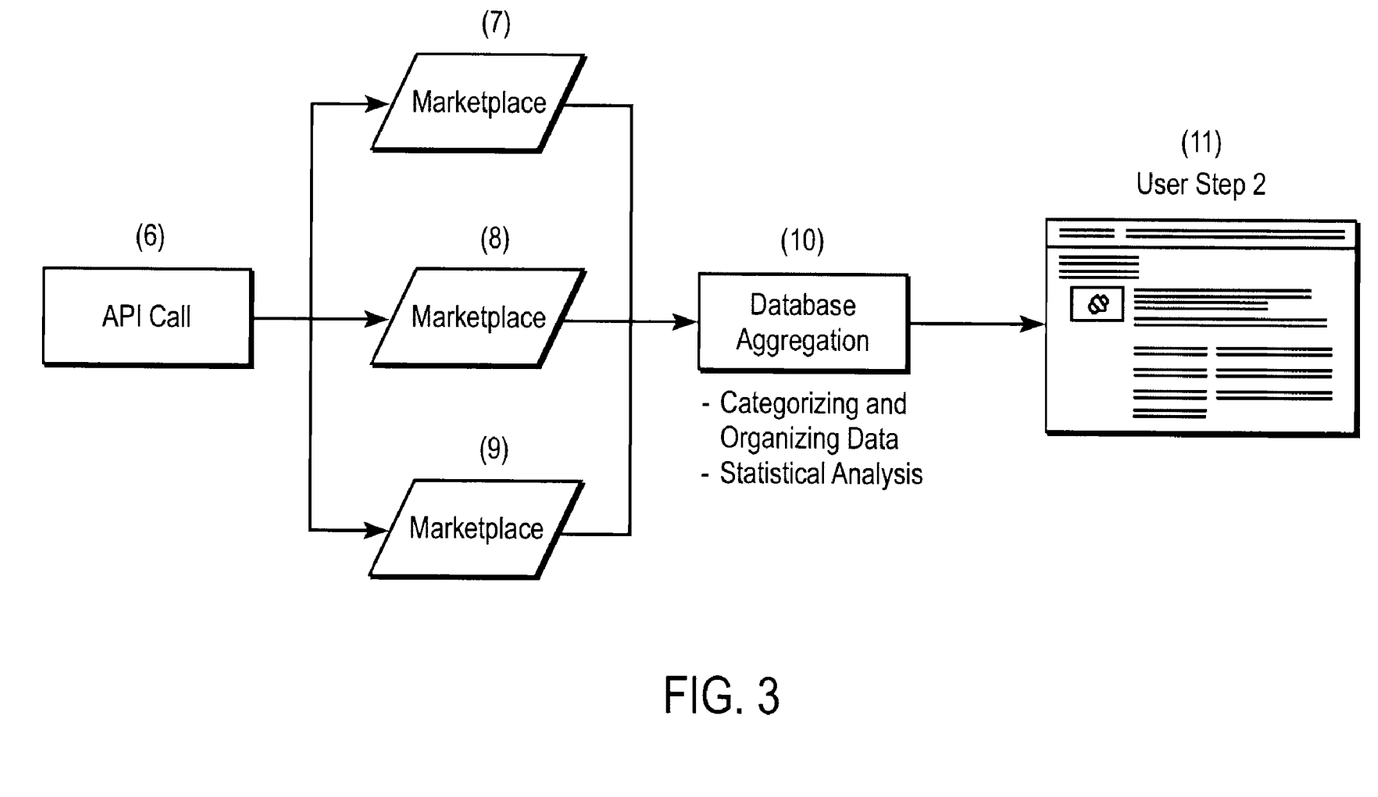
FIG. 3 represents the process flow for collecting market pricing information based on user searches.

FIG. 3 represents the process flow for collecting market pricing information based on user searches 5. An API call 6 is made to various internet sites to collect historical information relating to the product Internal databases aggregate data from multiple sources 7, 8, 9 and applies statistical analytics 10, to filter pricing history with the appropriate product. This process of analytics applies learnings from previous categorization and organization of data 2 and further combines this information with macro marketplace trends as well as specific internal decision tree elements for the purpose of creating a recommendation engine to suggest expected value for a single or multiple online marketplace(s). Pricing information for existing marketplaces based on historical closing prices is in many cases readily available however, in conventional systems, this data lacks the ability to be accurately tagged and mapped on a product by product basis, in contrast to the manner in which it is used by the present invention as described above.

Figure 4:
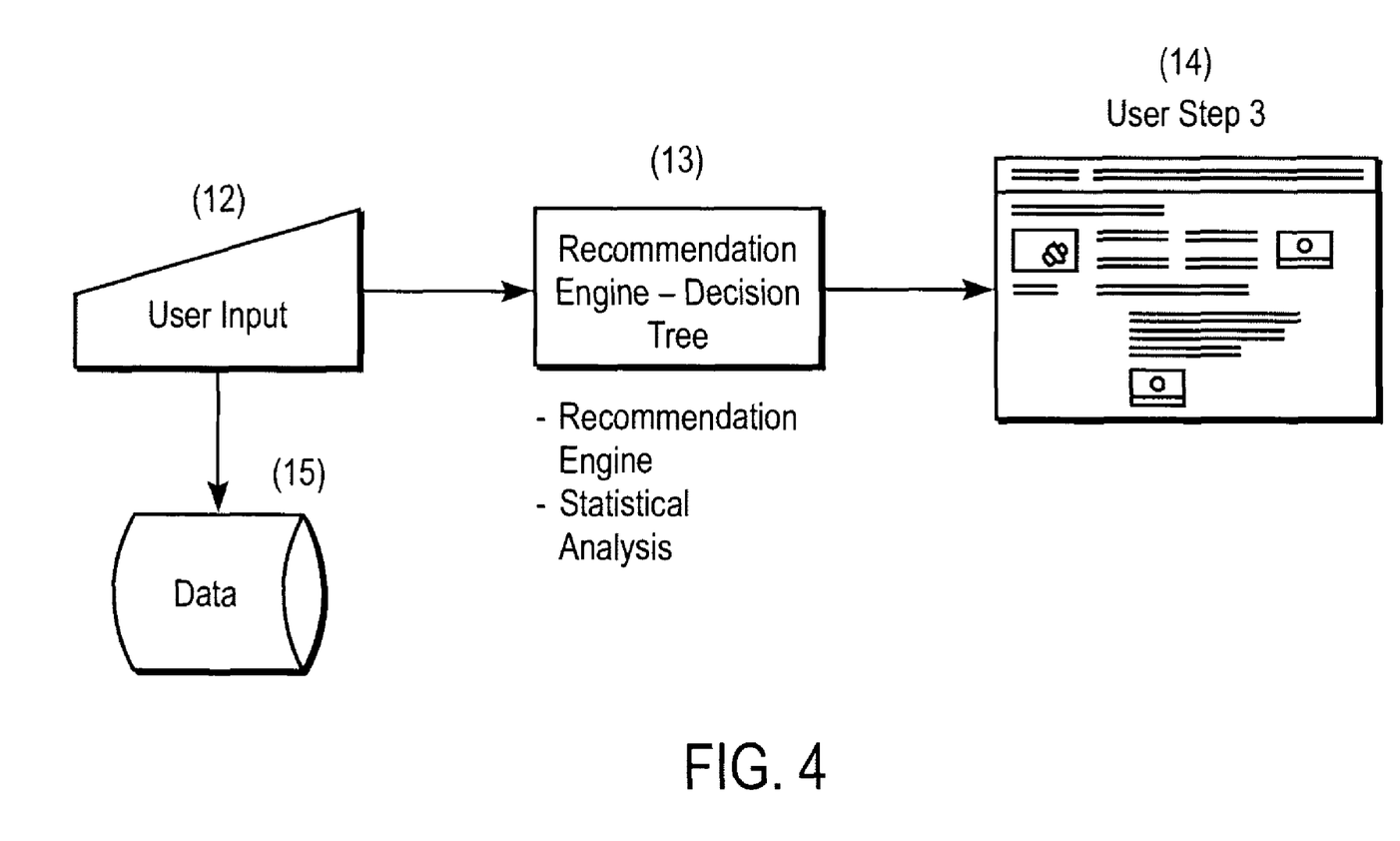
FIG. 4 is a process flow that illustrates how the present invention, using user input combined with custom design decision tree management and statistical analysis, presents a recommendation for online selling.

FIG. 4 describes the process by which user input 12 is used to develop the recommendation engine 13 which is then used to suggest listing platforms and selling parameters.

User input 12 involves parameters based on existing user preferences both known and to be discovered by the user that are necessary to understand and determine the appropriate selling marketplace. Examples of the appropriate selling marketplaces include, but are not limited to, ztail used listings, eBay, Cragislist, Amazon, Overstock, Google Base, Sell.com, and online classified aggregators as well as the hundreds of online classified marketplaces. Through a combination of price estimation techniques (45) and historical analytics (looking at day of week, date, time of day, seasonality) a list of appropriate options is presented to the user.

This list can address such parameters as price, sellers motivation, shipping, payment options, timing, types of payment receipt, transaction style, and risk tolerance. An initial assumption based on any user activity performed locally prior to this step will present a recommendation to the user, and will typically include a plurality of the different marketplaces, with typical combinations being ztail used listings, eBay or Amazon alone, followed by a combination of ztail, Google Base, Crags list and local classified aggregators (oodle or vflyer for example) sites, with a tertiary addition of direct combinations of local online classifieds. This recommendation will however have the ability to be edited, based on user preferences.

All preferences both edited, and unedited but accepted, will be stored locally and presented to users each time they return to the site. Multiple parameters across multiple platforms are preferably maintained on local servers 15 in order to expedite future transactions.

Any preferences or recommendations based on pricing will rely on the process described above (listing to product mapping) 45 to analyze date, timing, and historical data, in order to generate the most successful and accurate pricing estimation that can be anticipated from a closed transaction.

As described in 45, once the product is identified, the listing to product mapping technology will analyze historical data across multiple marketplaces (if appropriate) and return anticipated values for the appropriately selected marketplace. These values will be a combination of a) historical pricing, b) normalization for seasonality and timing and c) a probability regression analysis to account for user risk tolerance.

Figure 5:
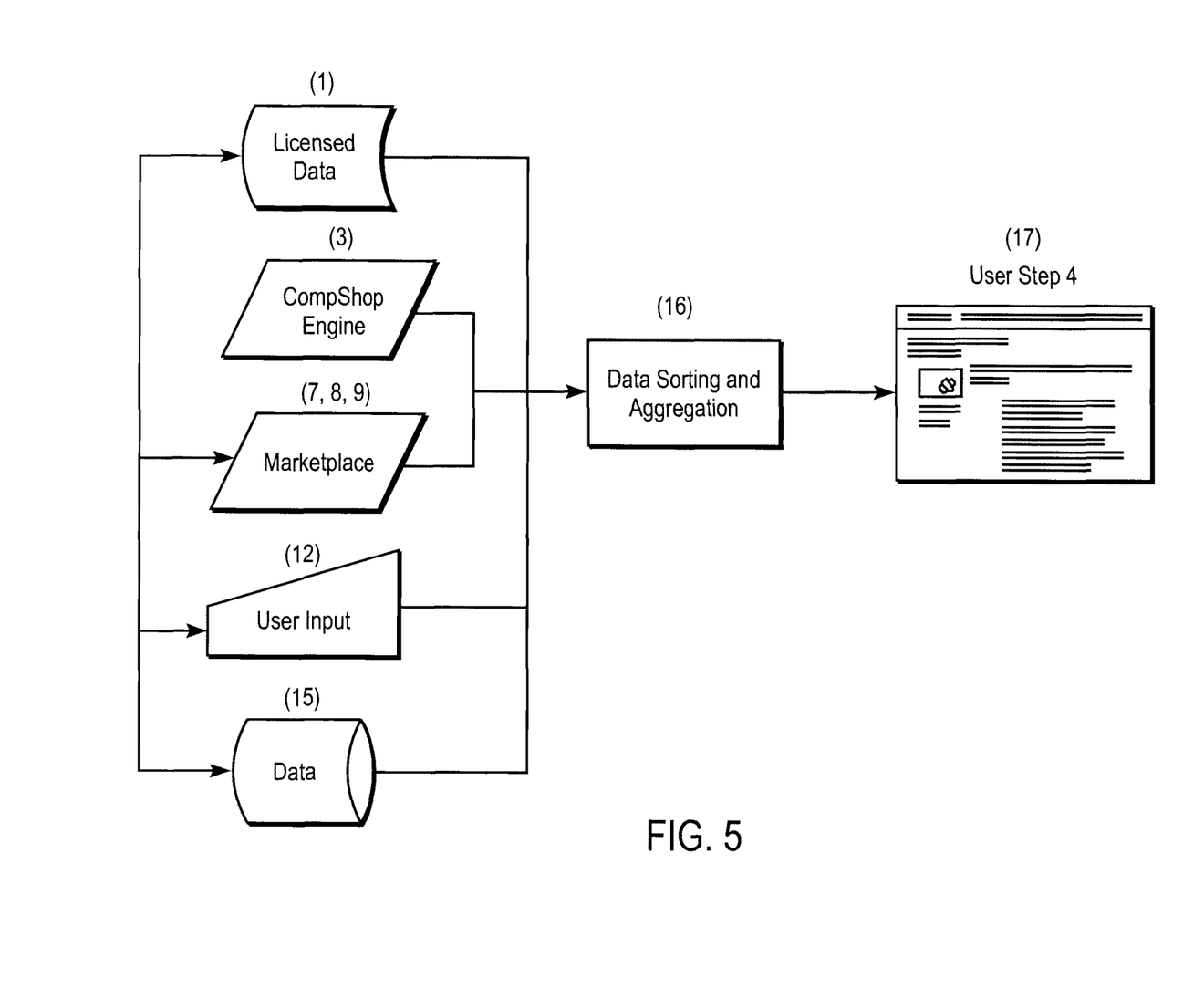
FIG. 5 presents the process by which previous steps' information, data, and user input are aggregated and organized into a listing.
Figure 9:
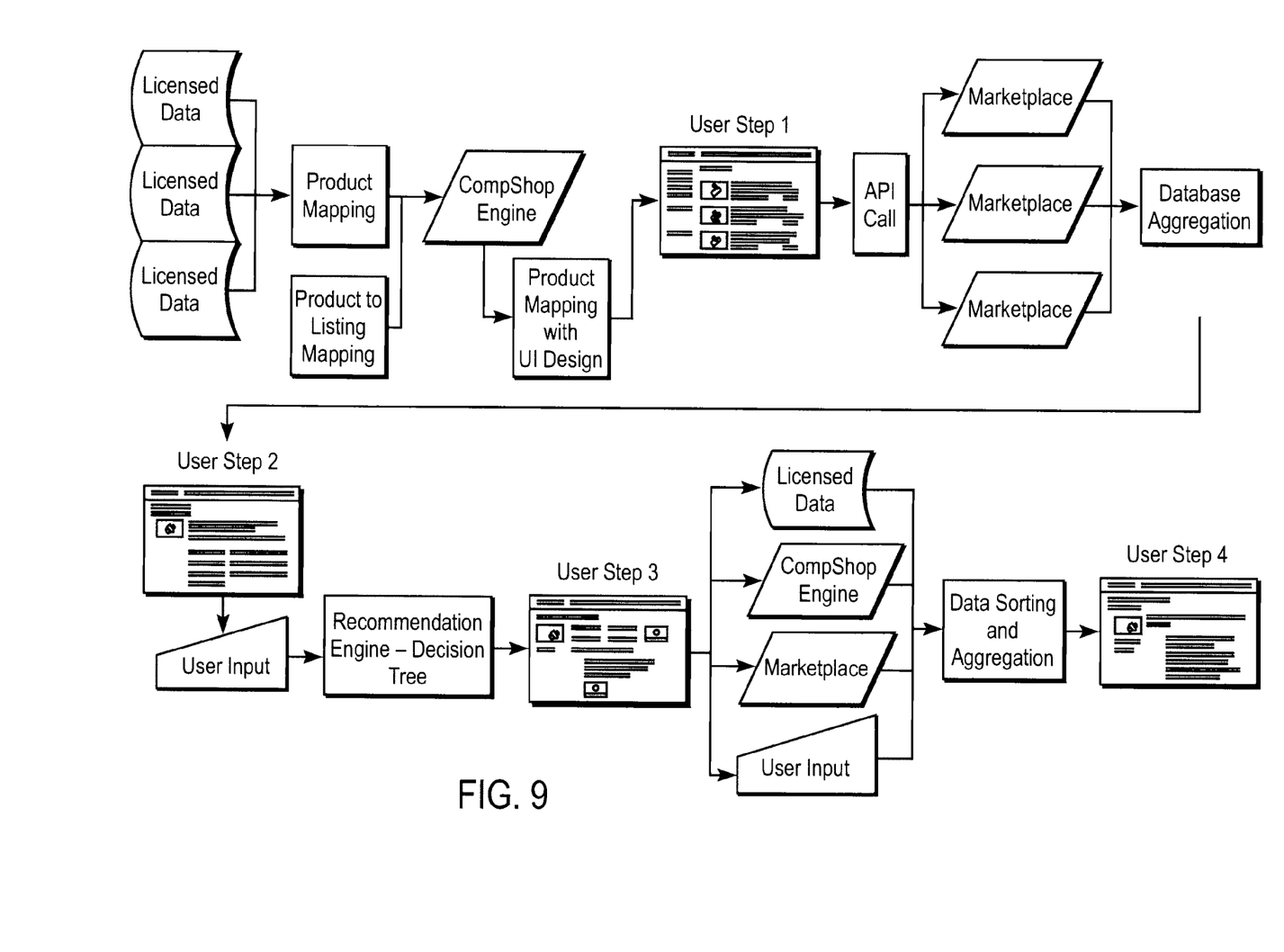
FIG. 9 illustrates an overview of the overall process of the present invention according to one preferred embodiment.

FIG. 5 is a process map that demonstrates the aggregation of several previous steps in the process flow of FIG. 9 in order to auto generate an online listing 17. The listing is generated from a combination of licensed data 1, product information garnered from the comparison shopping engine 3, market information garnered from various marketplaces 7, user input on very selling parameters 12, and warehoused data 15. The aggregation of this information 16, takes place on local servers and with proprietary aggregation software. Many areas of this process will be available for user editing, however defaults will be in place for most if not all necessary listing fields.

Figure 6:
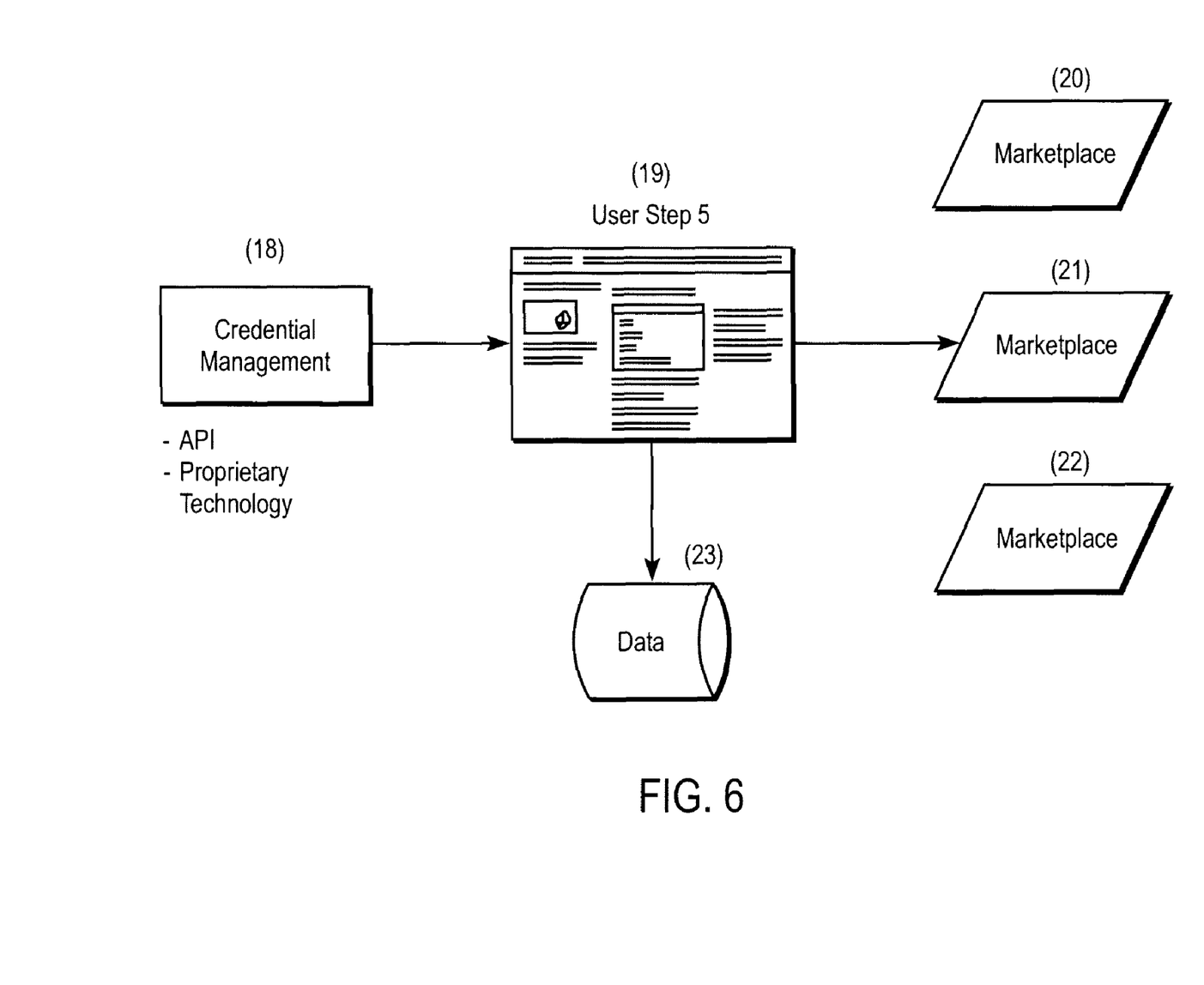
FIG. 6 is a representation of the process by which user input and credential management are combined in order to gain access to individual accounts across marketplace and ultimately to publish the listing across those marketplaces.

FIG. 6 presents a simplified, visual representation of the pushbutton publishing process. Using previous data, research, analytics, and user edited information, the listing 17, is at this stage prepared for syndication across multiple marketplaces 20, 21, 22. An interim step 19, handles credential management for one or more online marketplaces as in previous steps 15, this information is stored 23 locally. Upon receiving confirmation of user credentials for individual marketplaces, the listing 17 is published to those respective locations across the Internet, and this publishing can use open source Application Publisher Interface (API) technology that publishes the online listing across Internet platforms.

Figure 7:
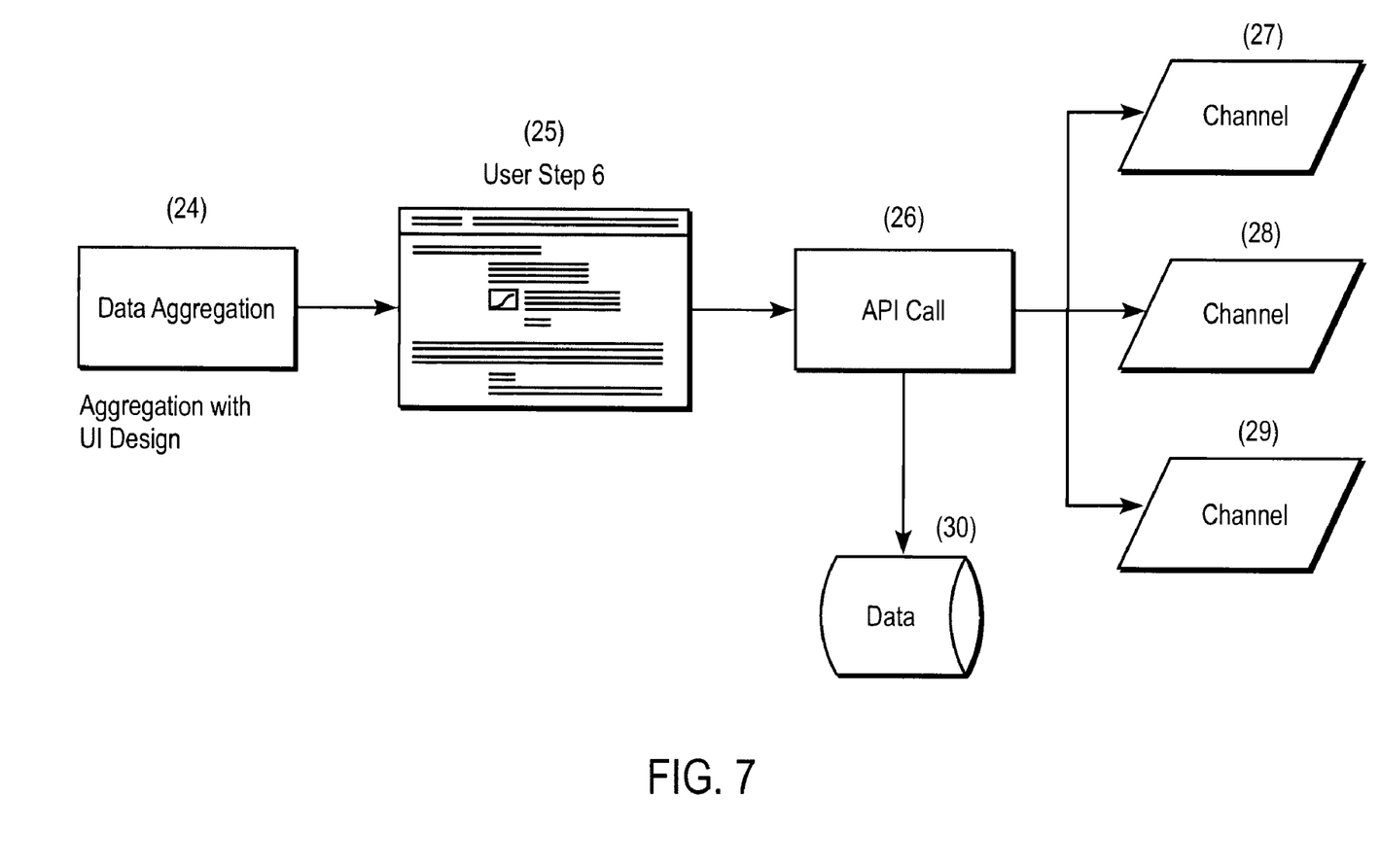
FIG. 7 is a process flow diagram that describes the manner in which the previously created listing is promoted across distribution channels.

FIG. 7 depicts the promote portion of the embodiment. Using information from prior steps the listing 17 is manipulated 24 and prepared for promotion. User input 25 allows for selection of a variety of distribution channels and as in previous steps 19 credential management processes 18, 26, are utilized in order to gain access on the user's behalf to the various promotion channels 27, 28, and 29. Again as in previous steps, credential management and user input is stored 30 locally. A combination of database aggregation and API technology acquires one or multiple user listings, and creates an online widget, with the different data field in the widget being periodically updated with current information, as a result of tracking and updating the information requested by these different data fields, as is known. The term 'widget' is general internet terminology, and is known to those skilled in the art, as it refers to any creation that can be transmitted across multiple locations on the internet and continue to act as an individual entity either on its own or as a subsection of an existing entity. This widget includes many pieces of previous steps (the core assets of an online listing), as well as additional tracking elements that will allow for further management of listing performance FIG. 8.

Figure 8:
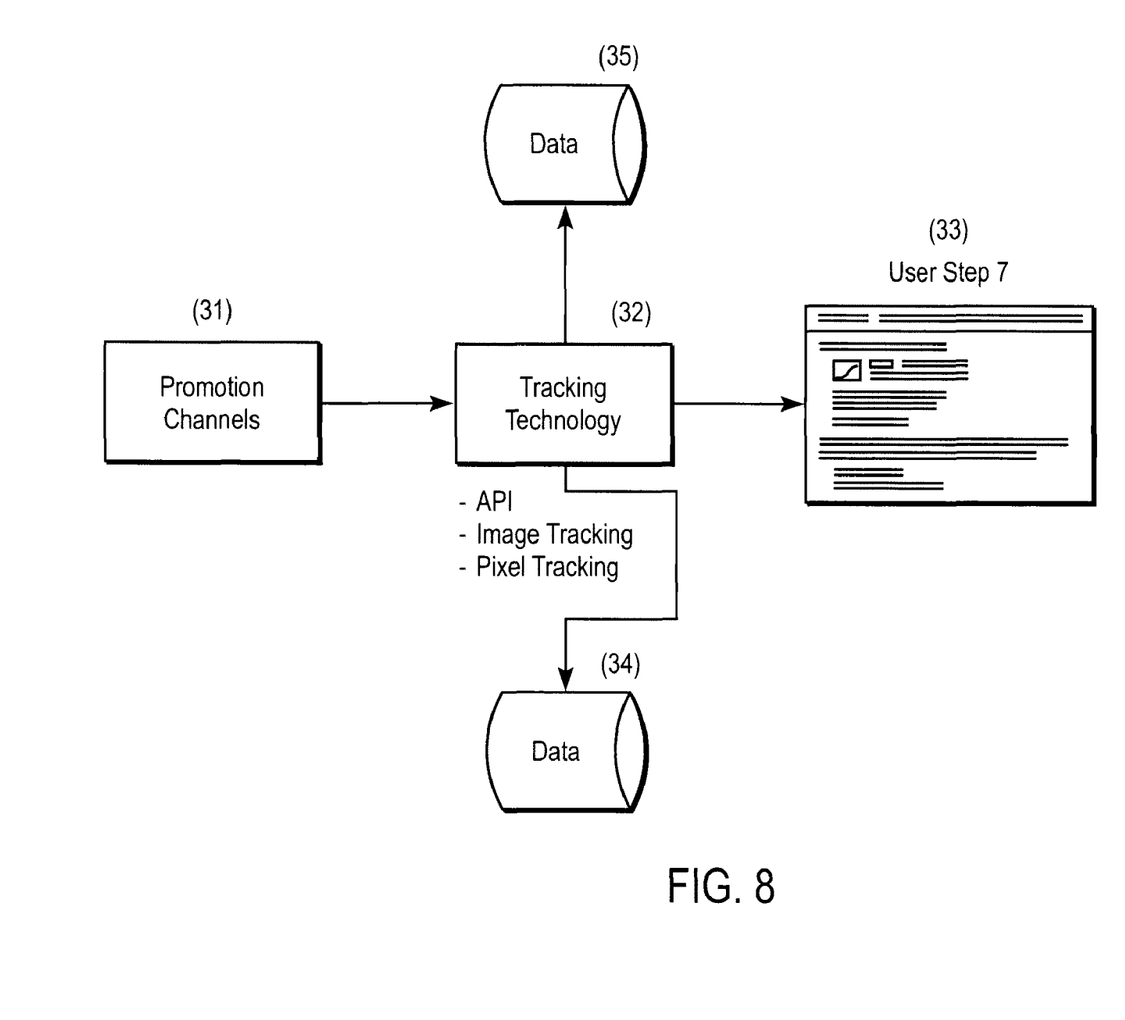
FIG. 8 presents the finals step in the process whereby the information in previous steps (FIG. 1 through FIG. 7) is tracked and analyzed in order to provide feedback.

FIG. 8 provides a simplified process of the final step, management. With publication of the widget across multiple channels (27, 28, and 29), tracking technology 32 is applied to the widget.

Tracking is obtained through the combination of a series of actions including user selection of Internet destination, application of tracking codes and widget signature, and the creation of a specific image, inserted into the widget after data is acquired through an API call, data feed or web crawler. This "image" is built as a way to display data collected as mentioned above. The conversion of data into an image (a physical file stored locally and viewed as an image (such as file extension .jpg or .gif) allows the widget to live on destination sites that do not allow constant linking which would be required, were the information not transformed into an image. This image is then placed on the appropriate widget with repeated calls from local servers to the origination of the data source (marketplace, data provider, etc) in order to update the information displayed on the image. Updates are made up to 4 times per hour.

User selected items for promotion result in the identification of a marketplace which is given its own code (Tracking A). Within each user account, the individual item is selected (Tracking B) and the widget is generated with its unique signature (Tracking C). All elements on the widget (which can include but are not limited to; links, buttons, and images), as shown by the example widget illustrated in FIG. 10 contain their own unique tracking identifiers (Tracking D) and engagement of those embodiments is also tracked on local servers. Within each widget, user selected destinations (such a multiple blogs or web pages) each receive their own id tag (Tracking E) such that one "widget can be placed in multiple locations and each can be individually identified and tracked.

The image within the widget (identified with a unique element code (Tracking D) is tracked to capture both views and clicks monitored through local servers. Every widget (and version of) is assigned this unique signature. Each time an image is rendered, local servers recognize this rendering and record the occurrence.

The image, which is stored locally, but can be displayed in a variety of locations, is repeatedly updated through API calls, server requests, data feeds and/or data push technology, from a local server. The information is stored locally and then transmitted to the aforementioned images in order to update the information therein. Optimization of the widget and associated links is achieved through the tracking of each unique widget element, across multiple widgets on multiple locations.

Sufficient efforts are made to ensure that the data is accurate and information such as IP location and call/image frequency are cross-referenced against the data to limit fraud, and invalid activity. Lists of known "bots" (or robots), "malicious bots" and "spammer bots" (known offenders based on IP and location) are maintained and clicks from any of these sources are identified and removed from the databases. Further measures are made using various click-frequency algorithms.

The data provided by these tracking elements are stored locally 34. This data 34 is then used to provide analysis and feedback 33, to the user. Internal databases collect online performance from various channels (27, 28 and 29) in aggregate and filter this information (26, and 32) which is then, is applied to general user interface 33, and includes various methods for visualization of data. Data is captured for multiple elements of the user widget traceable across each individual distribution channels (27, 28, and 29) and contains the ability to be cross-referenced across each individual element of the invention. If captured, data 34, and the results of that data based on analytics 32, are additionally stored 35, locally. This data is further used to enhance future iterations of the entire process as shown in FIG. 9.

FIG. 9 represents the embodiment of the entire process (FIG. 1-FIG. 8) described above.

Figure 10:
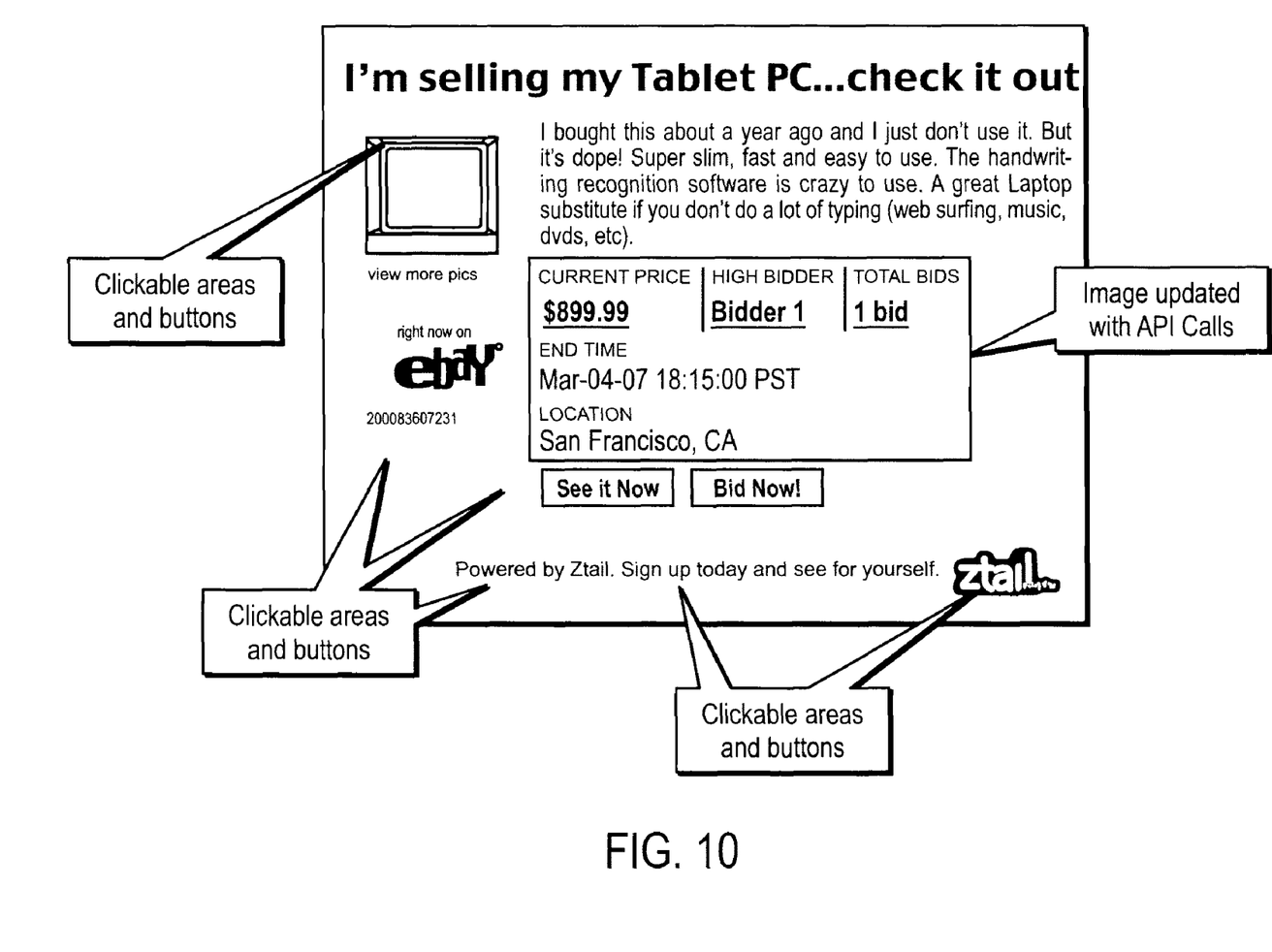
FIG. 10 illustrates an example widget according to the present invention.

FIG. 10 illustrates an example widget, with call-outs to show those areas that are active, and those areas that are updated as a result of utilizing the functionality of the image updating using API calls.

While the invention has been described in detail and referenced in the attached Figures to the embodiments thereof, those skilled in the technology and space, will understand that the foregoing and other changes in the current form in detail may be made therein without departing from the original spirit and scope of the invention.

What is claimed is:

1. A method of facilitating a user to offer for sale an article at one or more different online listing platforms comprising the steps of:
   receiving through an online interface on a computer from the user a description of the article and a plurality of user preferences pertaining to selling the article;
   recommending through the online interface on a computer, based upon the plurality of different user preferences and the article, the one or more different online listing platforms, the step of recommending including the step of providing a recommended sale price of the article for that online listing platform based upon historical data relating to the article, normalization of the historical data for seasonality and timing and a probability regression analysis to account for user risk tolerance;
   receiving through the online interface on a computer from the user a selection of which one or more recommended online listing platforms to use to attempt to sell the article and a sale price of the article for each;
   transforming the information about the article, for each selected online listing platform, into a listing to offer the article for sale, each listing including a description of the article, the sale price, and at least one mechanism to track the sale process each of the online listing platforms, each listing being formatted in a manner that conforms to the requirements of that particular online listing platform; and
   tracking each listing through the online interface on a computer.

2. The method of claim 1 wherein the step of creating the listing includes the step of creating a widget into which the listing is placed, and further including the step of updating at least some information stored on the listing after the listing has been posted using the widget.

3. The method of claim 2 wherein the step of updating at least some information updates the selling price to a new selling price.

4. The method of claim 3 wherein the step of updating occurs as a result of further data relating to other sales of products similar to the article that was obtained subsequent to posting of the listing.

* * * * *